Nov. 13, 1951  F. S. NANNA  2,575,068
AUTOMATIC FOOD FORMING AND COOKING MACHINE
Filed Oct. 8, 1949  4 Sheets-Sheet 1
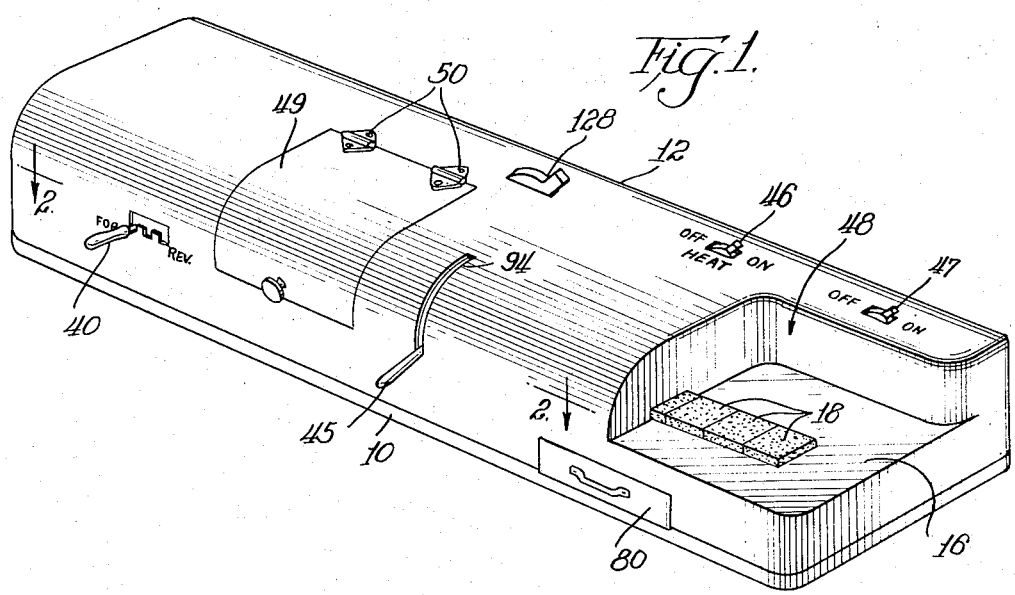
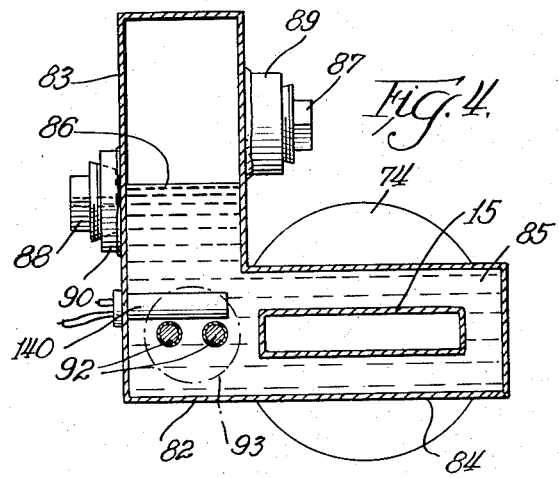
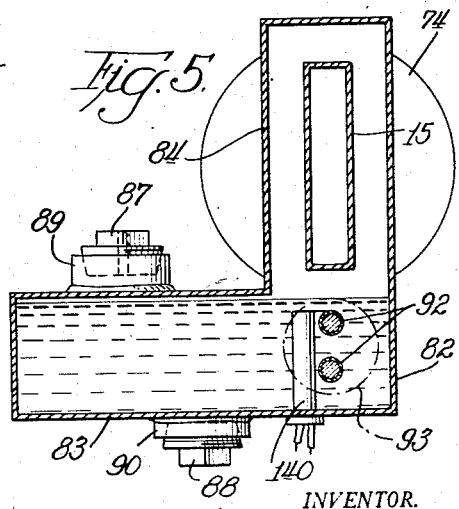
INVENTOR.
Frank S. Nanna
BY Albert G. McCaleb
Atty.

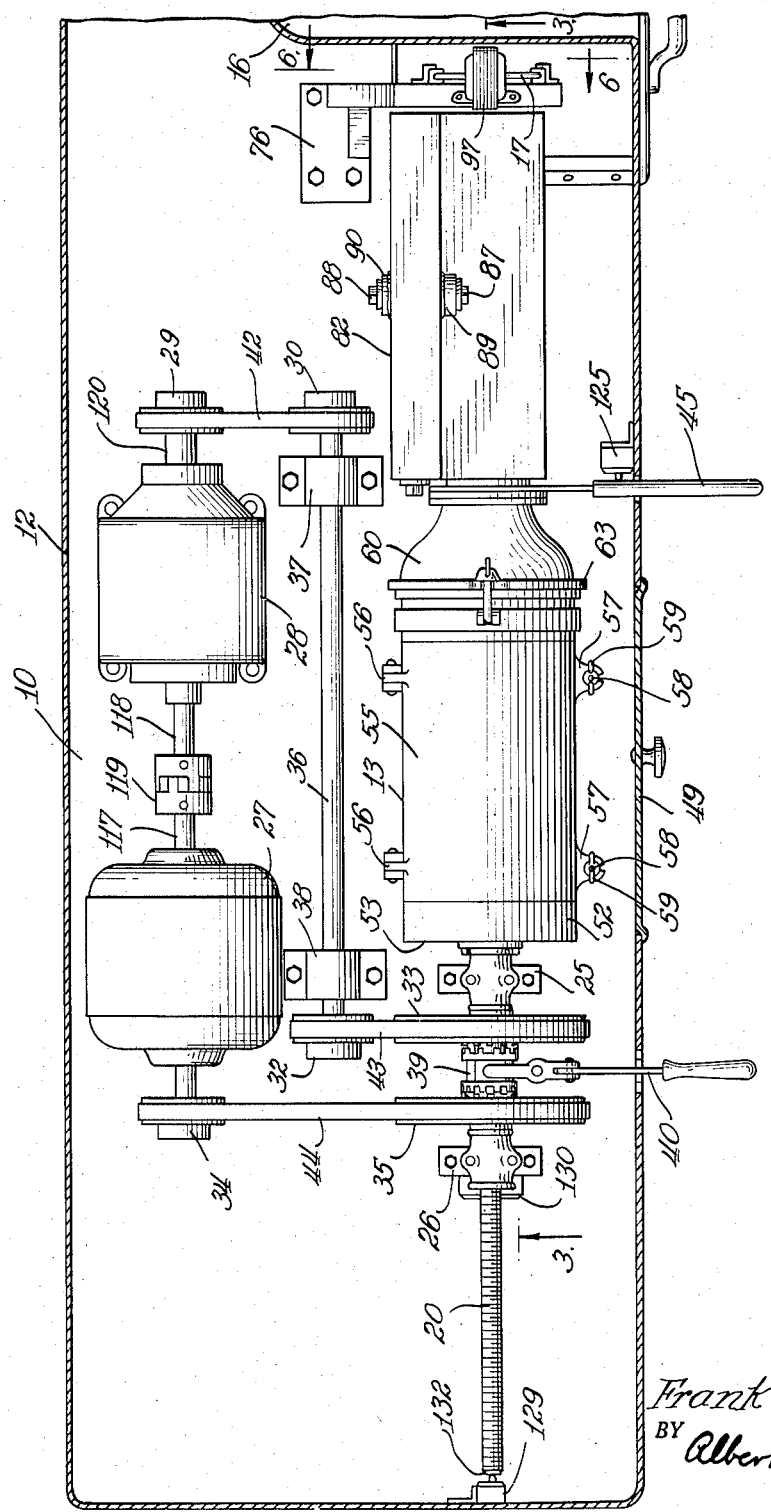

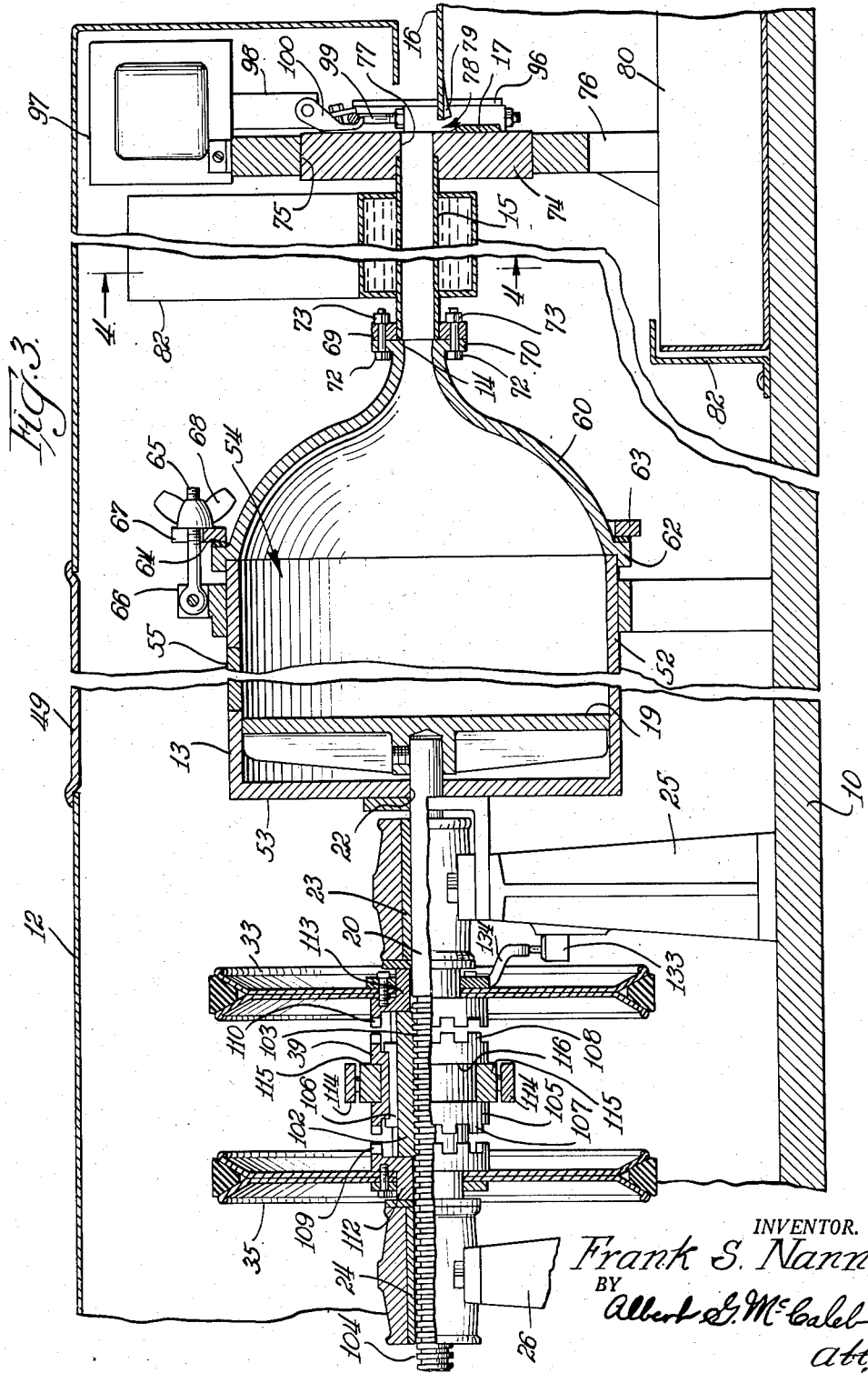

Nov. 13, 1951  F. S. NANNA  2,575,068
AUTOMATIC FOOD FORMING AND COOKING MACHINE
Filed Oct. 8, 1949  4 Sheets-Sheet 4

INVENTOR.
Frank S. Nanna
BY Albert G. McCaleb
Atty.

Patented Nov. 13, 1951

2,575,068

UNITED STATES PATENT OFFICE 2,575,068

AUTOMATIC FOOD FORMING AND COOKING MACHINE

Frank S. Nanna, North Lake Village, Ill.

Application October 8, 1949, Serial No. 120,341

3 Claims. (Cl. 99—353)

This invention relates to automatic food forming and cooking machines, and more particularly to those adapted to the formation and portioning of ground meat, such as hamburgers, and the like.

One of the more general objects of my invention is to provide a machine which, except for operations accompanying the supply of material and those attendant to the regulation of operation to take care of variations of demand, is automatic to the extent that with a relatively large quantity of meat, such as hamburger, placed therein, it shapes, apportions and cooks patties of a uniform size for use in sandwiches or on lunches and the like.

As another rather general object, my invention has within its purview the provision of an automatic food forming and cooking machine which is well suited to continuous and relatively rapid production of a large number of cooked meat patties or the like, and which is also capable of being stopped and started to take care of intermittent demands without waste of raw or partially cooked material and without the loss of appreciable time.

My invention has for another object the provision of a food cooking machine which is not only adapted to hold a relatively large supply of the raw food material and to progressively form and cook such material, but which also retains and cooks the food material while such food material has only a minimum and practically negligible exposure to the air.

It is a further object of my invention to provide a food forming and cooking machine wherein the food material is extruded through, and simultaneously cooked on all longitudinal faces in a tubular housing.

In correlation to the extrusion of the food material through a tubular housing for cooking, this invention comprehends the use of a container for raw food material which has a plunger moved forwardly at a substantially uniform rate to force the material through the tubular housing, and is provided with a mechanism for effecting quick withdrawal of the plunger for loading purposes.

In further correlation to the extrusion of food material through a tubular housing and the cooking of the material while in that tubular housing, it is within the purview of my invention to provide an outer housing which encloses the cooking portion of the tubular housing and which carries a liquid and a heating element in such relationship that the liquid normally carries heat from the heating element to all sides of the tubular housing; the parts also being so constructed and arranged that the liquid may be separated from the tubular housing, while remaining in contact with the heating element, thereby materially to reduce the heat applied to the tubular housing and keep the liquid hot for subsequent use.

I have also provided, as a part of this invention, an automatic food forming and cooking machine which includes a system of automatic and manual controls adapted to accomplish any one or more of the following purposes:

(a) Manually to shut off all parts of the machine;

(b) To effect preheating of the cooking parts before the food material is fed through the machine;

(c) Automatically to stop the food material feeding parts of the machine at both limits of the travel thereof;

(d) Manually to control the directions of movement of the food material feeding parts of the machine;

(e) Automatically to sever portion of the food material of predetermined size;

(f) Manually to effect automatic stoppage of the machine at the completion of the cooking of a selected full serving portion of the cooked food material; and (g) Automatically to prevent operation of the food material feeding mechanism except when the food forming and cooking parts are in their operative positions.

Other objects and advantages of the invention will be apparent from the following description and the accompanying drawings in which similar characters of reference indicate similar parts throughout the several views.

Referring to the four sheets of drawings:

Fig. 1 is a perspective view taken from in front and to one end of an automatic food forming and cooking machine embodying a preferred form of my invention;

Fig. 2 is a fragmentary top plan view of essential portions of the mechanism of my automatic food forming and cooking machine, with the housing thereof cut-away substantially at the position indicated by a line 2—2 in Fig. 1 and accompanying arrows;

Fig. 3 is a fragmentary side sectional view wherein the section is taken substantially as indicated by a line 3—3 and accompanying arrows in Fig. 2;

Fig. 4 is an end sectional view taken substantially on a line 4—4 of Fig. 3 and in the direction of the arrows when the disclosed parts are in their normal cooking position, as shown in Figs. 2 and 3;

Fig. 5 is a sectional view similar to that of Fig. 4, and wherein a different position of the parts is illustrated;

Figure 6:
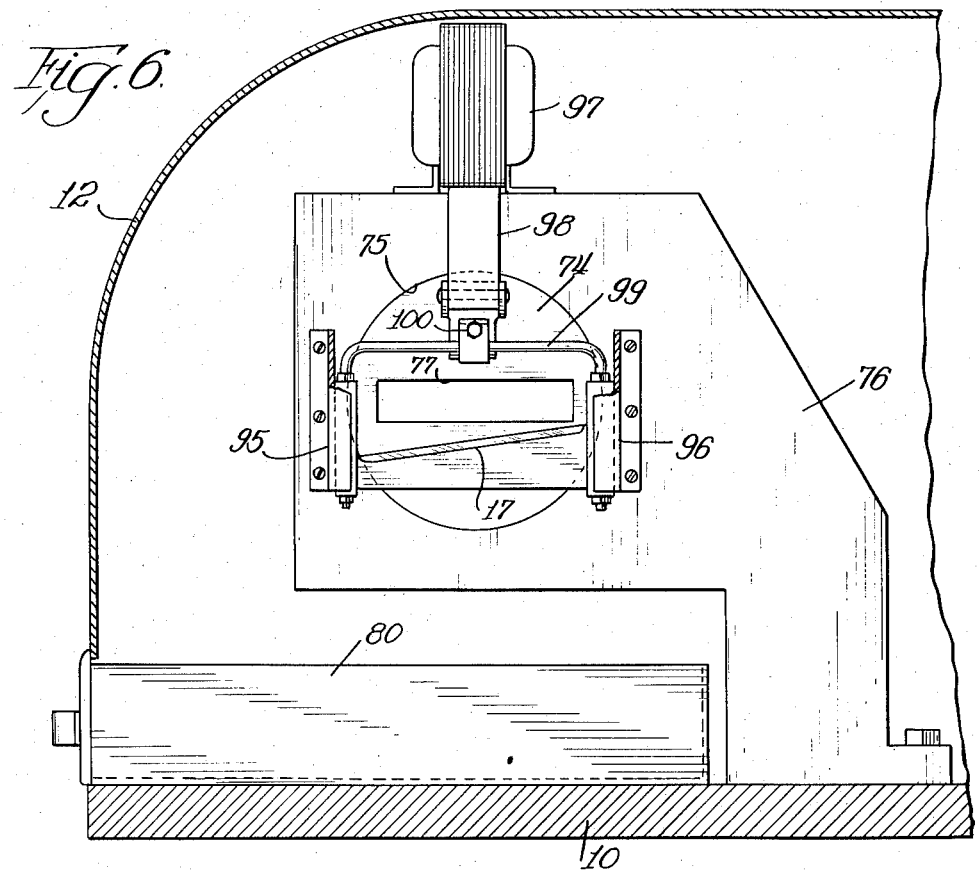
Fig. 6 is a fragmentary sectional view taken substantially on a line 6—6 of Fig. 2 and viewed in the direction indicated by accompanying arrows.

Considered generally, the exemplary embodiment of my automatic food forming and cooking mechanism which is disclosed herein for illustrative purposes comprises a unitary ensemble, the parts of which are mounted on a base 10 and enclosed within a housing 12. Although the disclosed machine might be utilized for the forming and cooking of various food materials, it is well suited, for example, to the rapid and continuous or intermittent cooking of meat, such as hamburger, and to the provision of portions of the cooked meat for use in sandwiches, serving on luncheons and the like.

A machine of the character herein disclosed is particularly adapted to use in restaurants, hamburger stands, or the like, where large quantities of food material are desirably prepared in short periods of time and served hot without the necessity of keeping them hot after cooking on a steam table or other heating device. With this purpose in view, the machine embodies a food supply housing 13 for holding a relatively large quantity of raw food material, such as hamburger.

At one end, the supply housing 13 has an outlet opening 14, as shown in Fig. 3, through which, and by the application of pressure to the material within the supply housing, the raw food material is extruded to a preselected shape, such as a relatively thin strip of generally rectangular section. From the outlet opening 14, the food material is forced through a cooking housing 15 of tubular section and of a size such that it is engaged on all sides by the food material passing therethrough. A major portion of the entire exterior surface of the cooking housing is heated; the length of the cooking housing, the temperature to which it is heated and the rate of passage of food material therethrough are proportioned and selected so that the food material is cooked to a desired extent during its passage through the cooking housing. From the cooking housing, the cooked food material emerges onto a retaining platform or table 16 at one end of the machine. In the disclosed structure, a knife 17 is mounted at the end of the cooking housing 15 remote from the supply housing and is actuated at predetermined intervals during the passage of food material from the cooking housing to sever the emerging cooked material into serving portions, such as 18, of a desired size.

In the disclosed structure, I have utilized a piston 19 for forcing the food material from supply housing 13 through the outlet opening 14; this piston being fitted into the supply housing for linear movement therethrough toward and from the outlet opening. For actuating the piston, a shaft 20 is secured to the piston 19 and is journalled for movement in a bearing bore 22 in the end of the supply housing 13 opposite the outlet opening 14, as well as in bearings 23 and 24, which are supported at spaced positions on the base 10 by pedestals 25 and 26 respectively. Actuation of the shaft 20 for effecting linear movements of the piston 19 in either direction within the supply housing is effected by a drive mechanism which, in the present instance, includes a prime mover in the form of an electric motor 27, a speed reducing gear box 28, driving connections including pulleys 29, 30, 32, 33, 34 and 35, a shaft 36 journalled in bearings 37 and 38, a clutch 39 and a manually operable clutch actuating lever 40; the pulleys, in the disclosed driving mechanism, being drivingly connected by flexible driving elements such as belts 42, 43 and 44.

Figure 7:
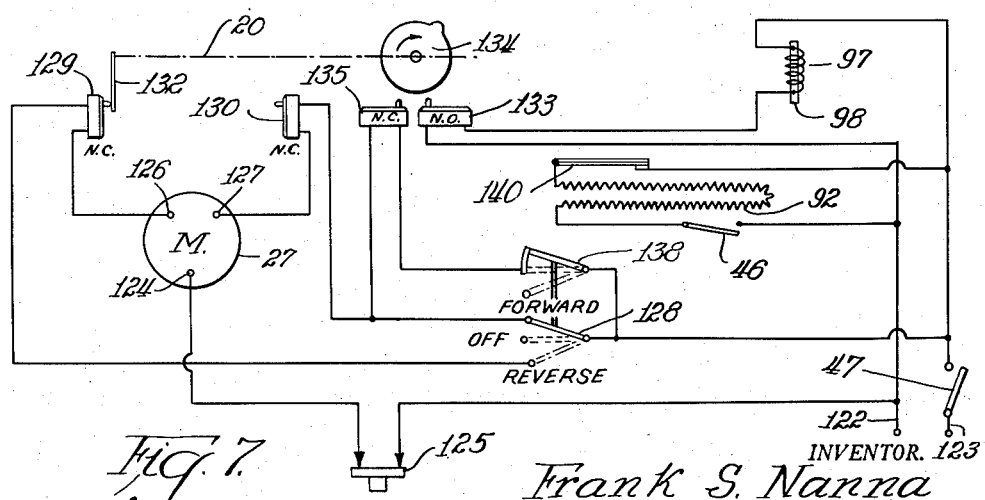
Fig. 7 is a schematic circuit diagram showing preferred electrical operating connections for the automatic food forming and cooking machine disclosed.

It being desired to provide a machine which is as nearly automatic as practical for rapid production of a larger number of portions of cooked food material, as well as to provide simple manual controls for use in reloading the machine and to take care of the varying demands of intermittent production, I have provided the electrical control circuit of Fig. 7 together with manual control elements including the clutch actuating lever 40, a heating control lever 45 and manually operable switches 46 and 47.

Referring in greater detail to the structures of the various parts and their operating relationships, the base 10 is a relatively rugged metal plate which may be either of sheet stock or formed. The housing 12, which is mounted on and secured to the base to form an overall cover for the operating parts of the machine, has a recessed portion 48 at one end which serves to form the platform or table 16, and also has a movable cover 49 connected thereto by hinges 50 to provide access to the food supply housing 13 for loading and cleaning purposes, as well as to expose other parts of the machine.

In its preferred form, the food supply housing 13 includes a stationary cylindrical part 52 with a plane wall 53 at one end and an opposed open end 54; the bearing bore 22 extending axially of the cylindrical housing through the plane wall 53. To facilitate the loading and cleaning of the food supply housing, an upper and semi-cylindrical portion thereof comprises a movable cover 55 which, in the present instance, is connected to the lower portion of the housing by hinges 56 and has fastening means such as projecting lugs 57, screws 58 and wing nuts 59 for holding it in closed position relative to the lower parts of the housing.

As depicted in Fig. 3, an internally convex end bell 60 provides a cover for the open end 54 of the supply housing and has a flanged rim 62 thereon which fits over the open end of the cylindrical part 52 of the housing with a fit adapted to permit rotational movement of the end bell relative to the rest of the housing. For holding the end bell in place relative to the end of the housing, while permitting rotational movement thereof, I have provided a ring 63 which abuts a peripheral and axially disposed shoulder 64 and is adjustably held in place by screws such as 65 movably anchored to lugs 66 at spaced positions peripherally of the housing part 52 and which extend through slots such as 67 in the ring 63 and are provided with wing nuts 68. In my preferred structure, the end bell 60 presents smoothly curved internal surfaces extending to the outlet opening 14; that outlet opening, in the present instance, being of generally rectangular shape and considerably wider than its depth. Also, in the disclosed machine, the outlet opening is centrally located in the end bell and coaxially disposed with reference to the shaft 20 and the surface of the cylindrical housing part 52, so that rotation of the end bell with reference to the stationary part of the housing turns the opening about its geometric center. The cooking housing 15, which is in the form of a tube of generally rectangular section, adjoins the end bell 60 in communication with the outlet opening 14 and is removably clamped in place by a clamping ring 69 secured thereto and held against a flange 70 on the end bell 60 adjacent the outlet opening by fastening means such as bolts 72 and coacting nuts 73. At its opposite end, the tubular cooking housing 15 is carried by a circular supporting element 74 which in turn is supported for rotational movement about the longitudinal axis of the cooking housing by a bearing 75 in a support bracket 76 which is secured to the base. An opening 77 in the supporting element 74 is aligned with the internal opening through the cooking housing to provide for the passage of cooked food material from the end of the cooking housing opposite the supply housing 13. From the opening 77, the cooked food material passes onto the upper surface of the table 16. In a machine, such as that disclosed, which is adapted to the cooking of meat, a space is provided between the supporting element 74 and a downwardly sloped lip 79 on the adjacent end of the table 16, so that grease cooked out of the meat during its passage through the cooking housing will drip into a drip pan 80, in the form of a drawer and supported by the base 10 below the space 78. In my preferred structure, the drip pan 80 extends through an opening in the front of the housing and is mounted for sliding movement on the base 10 between the side brackets, such as 82.

Since the raw food material is extruded through the outlet opening 14 in the end bell 60 of the supply housing under pressure, it is my preference that the interior of the cooking housing 15 shall be slightly larger than the outlet opening, as shown in Fig. 3, so as to provide some relief for the pressure within the cooking housing while still providing heat transferring contact between the entire inner surface of the cooking housing and the surfaces of the food material passing therethrough. In the disclosed machine, all surfaces of the cooking housing are heated during the passage of food material therethrough, so that the food material is cooked on and from all sides at the same time.

My disclosed structure for effecting the application of heat to the exterior surfaces of the cooking housing includes an outer housing 82 of substantially L-shaped section. This outer housing covers the major portion of the length of the cooking housing 15 between the coupling ring 69 and the supporting element 74 and includes longitudinally extending leg portions 83 and 84 which project angularly from one another laterally of the housing. The cooking housing extends longitudinally through the mid-portion of one of the leg portions of the outer housing; there being fluid-tight joints between the ends of the outer housing and the cooking housing and space surrounding the cooking housing within the outer housing for carrying a heating liquid 85, as illustrated in Fig. 4. As one liquid suitable for the purpose, I have used steam cylinder oil which is referred to generally as 600-W. When the outer housing 82 is in the normal cooking position illustrated in Figs. 2, 3 and 4, the liquid 85 surrounds the cooking housing within the outer housing and preferably extends to a level 86 above the leg 84 in the leg 83. Screw plugs 87 and 88 are provided in flange rings 89 and 90 on opposed walls of the leg 83 of the outer housing for use respectively in filling and draining the outer housing.

An electrical heating element 92 is supported by an insulated plug 93 in an end wall of the outer housing and extends longitudinally of the outer housing, internally thereof at the junction of the legs 83 and 84. Thus, when the housing is in the normal cooking position illustrated in Fig. 4, the liquid covers both the heating element 92 and the cooking housing 15. However, upon rotation of the outer housing together with the cooking housing by the axis of the cooking housing on the bearing 75, the liquid flows from the leg 84 to the leg 83, so as to become separated from the cooking housing while still covering the heating element 92. The latter position is utilized for keeping the heating liquid hot while very greatly decreasing the heat applied to the cooking housing during relatively short intervals of inactivity of the machine. The heating control lever 45 is secured to the cooking housing at the coupling ring 65 to effect such rotational movements of the cooking housing and outer housing from a position at the front of the machine; the heating control lever 45 extending through and being movable in a slot 94 in the outer housing 12.

The knife 17 for severing the portions of the cooked food material is mounted adjacent the outer end of the opening 77 with its opposite ends supported for linear movement by brackets 95 and 96 which are secured to the brackets 76 on opposite sides of the supporting element 74 to adapt the knife for automatic electrical operation. A solenoid 97 has a movable armature 98 which is connected to the knife 17 through a yoke 99 and a coupling 100. Normally, the knife gravitates to a position below the opening 77, and is moved across that opening to sever the extending food material when the solenoid 97 is energized.

The shaft 20, through which the piston 19 is actuated to force food material from the supply housing and through the cooking housing, is keyed or splined to prevent its rotation relative to the bearings 23 and 24, while permitting axial movement of the shaft toward and from the outlet opening 14. A clutch sleeve 102, on the other hand, has internal threads 103 which drivingly engage a threaded portion 104 of the shaft, so that rotational movement of the clutch sleeve effects axial movement of the shaft. A driving ring 105 is drivingly connected to the clutch sleeve 102 by a key 106, so that it is axially movable relative to the clutch sleeve. At its opposite ends, the driving ring 105 has teeth 107 and 108 which are selectively engageable with teeth 109 and 110 respectively on hubs 112 and 113 of the pulleys 35 and 33 respectively. Axial movement of the driving ring 105 to effect selection of the pulley with which it is engaged is effected by lateral movement of the operating lever 40 which has fingers 114 at its end connected to jaws 115 on opposite sides of the driving ring and slidable peripherally of the ring in a channel 116. Since, as will be more fully explained, the pulleys 33 and 35 are driven in opposite directions and at different speeds, operation of the clutch 39 by movement of the lever 40 determines the direction and rate of movement of the piston 19 in the supply housing 13. Also, the driving ring 105 has a neutral position intermediate the hubs 112 and 113 of the respective pulleys, so that the piston may be stopped.

As depicted in Fig. 2, the motor or prime mover 27 is connected to the speed reducing gear box through shafts 117 and 118 and a coupling 119. The gear box 28 is one of standard construction and provides a very considerable reduction in speed between that of the motor shaft 117 and an output shaft 120. In the disclosed structure, the piston 19 is driven toward the output opening 14 of the supply housing through the gear box 28, pulleys 29 and 30, shaft 36 and the pulleys 32 and 33. Thus, the rate of movement of the piston for extruding food material through the output opening 14 of the supply housing is reduced to a selected value by the driving mechanism. It being desirable to limit the time necessary for returning the piston to its starting position, as illustrated in Fig. 3, for inserting a new supply of food material into the supply housing, the shaft 20 is driven at a considerable higher speed for such return movement. As shown in Fig. 2, the driving connection for returning the shaft to its starting position is direct from the motor 27 and is provided by the pulleys 34 and 35 and a connecting belt 44.

The circuit diagram of Fig. 7, when considered in connection with the structural views of the drawings, illustrates the structure and manner of control utilized in my disclosed food forming and cooking machine. Power for the operation of the entire machine is provided through power supply line leads 122 and 123 and the manually operable main control switch 47. In the disclosed structure, the motor 27 is reversible. Operating current is provided to a common motor terminal 124 from the power supply line lead 122 through a switch 125, which switch 125, as shown in Fig. 2, is actuated by the heating control lever 45 so as to close the circuit to the motor only when the cooking housing 15 and outer housing 82 are in their proper position for cooking food material as it passes through the cooking housing. From the power supply line lead 123, operating current is selectively provided to either of two terminals 126 or 127 of the motor 27 through a manually operable reversing switch 128 and normally closed limit switches 129 and 130 respectively. The reversing switch 128, as shown in Fig. 1, is mounted for manual actuation at a position near the clutch control lever 40. The limit switches 129 and 130, in addition to being connected in series with the motor terminals 126 and 127, are also mounted, as shown in Fig. 2, for actuation by an arm 132 which is secured to the end of the shaft 20. Thus the switches being normally closed and opened by engagement of the arm 132 therewith, the motor 27 is automatically stopped when the piston reaches its extreme limit of movement in either direction. It may be readily appreciated that when the circuit for operating the motor in one direction is opened by one of the limit switches 129 or 130, a circuit for operation in the other direction may be closed by movement of the manually operable switch 128.

The heating element 92 is connected to the power supply line leads 122 and 123 through the main control switch 47 and through the heater control switch 46. Also, a thermostatic switch 140 is connected in series with the heating element to limit the maximum temperature of the heating liquid. The placement of this switch in the structure is shown in Figs. 4 and 5. By closing both of the switches 46 and 47 while the circuit to the motor is opened by the switch 128, the heating element and heating liquid may be brought up to cooking temperature before the food material is forced through the cooking housing.

The solenoid 97 which actuates the knife 17 is connected to the power supply line leads 122 and 123 through the main control switch 47 and a normally open cam actuated switch 133. As shown in Fig. 3, a cam 134 is secured to the pulley 33 and is shaped to effect operation of the switch 133 at a predetermined position, or at predetermined intervals of the movement of the shaft 20. Rotation of the cam 134 effects periodic energization of the solenoid 97 to actuate the knife 17, thereby to sever a portion of the cooked food material. In my preferred structure, a second switch 135 is mounted for actuation by the cam 134. The switch 135 is connected in series with a switch 138 which is mechanically connected for actuation with the switch 128; the contacts of the switch 138 being so connected that the series connected switches 135 and 138 bridge the open contacts of the switch 128 when the latter switch is in the "off" position. Thus, with the switch 128 in position for "forward" operation of the motor and normal operation of the machine, the operation of the switch 135 by the cam 134 has no effect. However, when the switch 128 is moved to the "off" position, the machine will continue to run until it is shut off by the opening of switch 135 by the cam 134—thereby stopping upon the completion of a serving portion which has been severed.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In an automatic food forming and cooking machine, the combination comprising a tubular cooking housing having a predetermined sectional shape and open ends, an outer housing of substantially L-shaped lateral section and having angularly disposed legs, said cooking housing extending longitudinally through the mid-portion of one of the legs, a heating element mounted in the outer housing at the juncture of the legs, and a predetermined quantity of liquid in the outer housing, the volumes of said legs and the quantity of liquid in the outer housing being so proportioned that in one position of the outer housing the cooking housing and the heating element are both immersed in the liquid, while in another position of the outer housing only the heating element is immersed in the liquid.

2. An automatic food forming and cooking machine comprising, in combination, a base, a stationary supply housing for food material mounted near the mid-portion of the base and having an outlet opening for food material at one end and a normally covered loading opening therein, a piston fitted into the supply housing and movable toward and from the outlet opening, a threaded shaft secured to the piston and extending from the end of the supply housing opposite the outlet opening in a direction coaxial to the direction of piston movement, aligned bearings supported from the base and supporting the shaft for axial movement, pulleys supported for free rotation relative to the shaft, clutch means threadedly engaging the shaft and including a driving element manually and selectively movable into driving engagement with each of the pulleys, motive means for driving the pulleys in opposite directions, whereby operation of said clutch means effects selection of the direction of movement of the shaft and piston, a tubular cooking housing having one end adjoined to the supply housing and communicating with the outlet opening thereof, means for supplying heat to the cooking housing, and a delivery platform for receiving cooked food material from the end of the cooking housing opposite the supply housing, said means for supplying heat to the cooking housing including an outer housing enclosing a major portion of the length of the tubular cooking housing, a heating element mounted in the outer housing in spaced relationship to the cooking housing, and a liquid contained within the outer housing in a quantity sufficient normally to cover both the cooking housing and heating element, said outer housing being substantially L-shaped in section and having portions extending angularly from one another and communicating internally, said heating element being located at the juncture of said portions and the cooking housing extending through one of the portions, and means supporting the cooking housing and outer housing for rotational movement about an axis extending longitudinally through the cooking housing, whereby in one position of the outer housing the liquid covers both the heating element and the cooking housing and in another position of the outer housing the liquid is separated from the cooking housing and covers only the heating element.

3. In an automatic food forming and cooking machine, the combination comprising a substantially cylindrical supply housing for uncooked food material, said supply housing including a part having axially opposed open and closed ends with an axial bearing bore in the closed end, a piston fitted for axial movement in said part of the supply housing a shaft journalled for axial movement in said bearing bore and secured to the piston, an end cover for the open end of said part of supply housing having an inner concave surface, said end cover having an opening therein through which food material from the housing is extruded as the piston moves toward that opening, clamp means for holding the cover against the open end of said part of the supply housing in a manner such that the cover may be rotated relative to said part, a tubular cooking housing secured to the end cover and having an open end in communication with said opening for receiving the food material extruded through the opening, means for heating the cooking housing to a temperature for cooking the food material, means for rotatably supporting the end of the cooking housing remote from the end cover, an outer housing enclosing a portion of the cooking housing between the ends thereof, said outer housing being carried by the cooking housing and rotatable therewith, said means for heating the cooking housing including a heating element and a predetermined quantity of liquid within the outer housing, and the shape of the outer housing, the position of the heating element therein and the quantity of said liquid in the outer housing being such that in one position of the outer housing both the cooking housing and the heating element are immersed by the liquid, while rotational movement of the outer housing to a second position effects separation of the liquid from the cooking housing and leaves the heating element immersed.

FRANK S. NANNA.

REFERENCES CITED

The following references are of record in the file of this patent:

UNITED STATES PATENTS

| Number | Name | Date |
|---|---|---|
| 230,449 | Tyson | July 27, 1880 |
| 462,485 | Grotenrath | Nov. 3, 1891 |
| 597,502 | Lakmer | Jan. 18, 1898 |
| 806,445 | Wilson | Dec. 5, 1905 |
| 1,214,627 | Wild | Feb. 6, 1917 |
| 1,471,727 | Gomez | Oct. 23, 1923 |
| 1,881,126 | Parr | Oct. 4, 1932 |
| 1,912,765 | Erni | June 6, 1933 |
| 2,208,651 | Wallace | July 23, 1940 |
| 2,370,701 | Woodbury | Mar. 6, 1945 |